Figure 1:
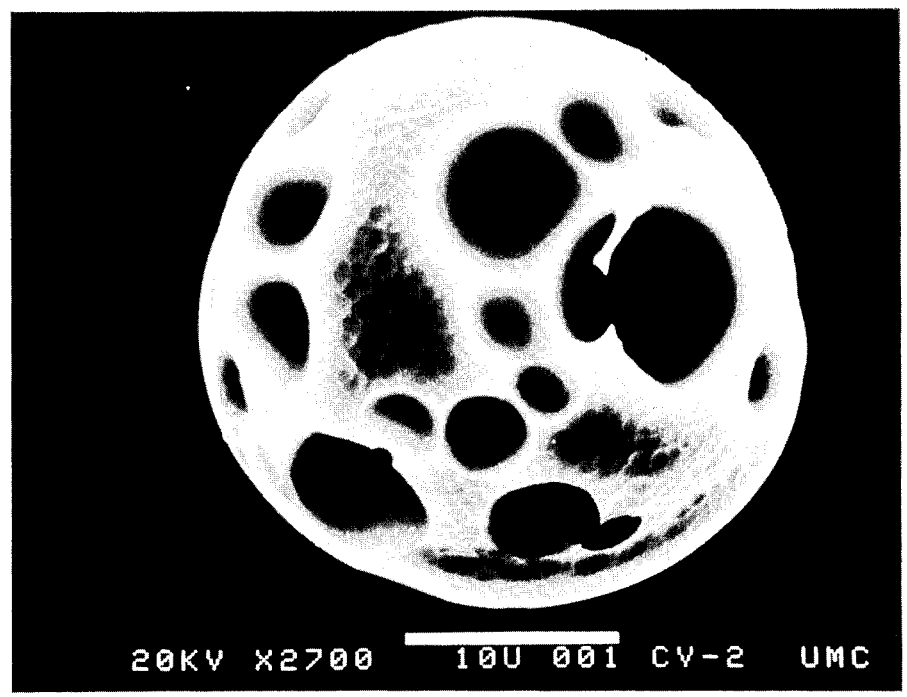

United States Patent [19]

Carpenter et al.

[11] Patent Number: 4,830,917

[45] Date of Patent: May 16, 1989

[54] PRODUCTION OF MICROPOROUS FINELY DIVIDED MATRIX MATERIAL WITH NUCLEAR TRACKS FROM AN ISOTROPIC SOURCE AND PRODUCT THEREOF

[75] Inventors: B. Stephen Carpenter, Boyds, Md.; Csaba Horvath, Orange, Conn.; Corazon R. Vogt, Battle Creek, Mich.

[73] Assignee: The Curators of The University of Missouri, Columbia, Mo.

[21] Appl. No.: 866,334

[22] Filed: May 22, 1986

[51] Int. Cl.$^4$ .................... B32B 3/26; B44C 1/22; C03C 15/00; C03C 25/06

[52] U.S. Cl. .................... 428/315.5; 65/31; 156/628; 156/644; 156/655; 156/657; 156/643; 156/663; 156/668; 252/79.3; 252/79.5; 428/315.7; 428/312.6

[58] Field of Search ............. 156/628, 644, 643, 655, 156/657, 663, 668; 428/131, 137, 312.6, 314.2, 315.5, 315.7; 252/79.3, 79.5; 65/31; 250/492.1, 492.2, 492.3, 503.1, 518.1; 210/348, 500.10, 500.22, 500.26, 500.27, 510.10

[56] References Cited

U.S. PATENT DOCUMENTS

| | | | |
|---|---|---|---|
| 3,549,524 | 12/1970 | Haller | 210/31 |
| 3,612,871 | 10/1971 | Crawford et al. | 156/644 X |
| 3,713,921 | 1/1973 | Fleicher et al. | 156/2 |
| 3,790,475 | 2/1974 | Eaton | 210/31 C |
| 3,792,987 | 2/1974 | Eaton | 65/31 |
| 3,804,647 | 4/1974 | Elmer et al. | 106/54 |
| 3,843,341 | 10/1974 | Hammel et al. | 65/22 |
| 4,169,790 | 10/1979 | Pretorius et al. | 210/31 |
| 4,268,347 | 5/1981 | Stephens | 156/628 |

FOREIGN PATENT DOCUMENTS 0150288 8/1985 European Pat. Off. .

Primary Examiner—William A. Powell
Attorney, Agent, or Firm—Grace J. Fishel

[57] ABSTRACT

A process is disclosed for the production of finely divided matrix material having substantially uniform porosity about the surface thereof with nuclear tracks from an isotropic source. Selected products of the process have only surface porosity or pores which pass completely through the matrix material.

18 Claims, 2 Drawing Sheets

PRODUCTION OF MICROPOROUS FINELY DIVIDED MATRIX MATERIAL WITH NUCLEAR TRACKS FROM AN ISOTROPIC SOURCE AND PRODUCT THEREOF

The invention described herein may be manufactured and used by or for the Government of the United States of America for all governmental purposes without the payment of any royalty.

The present invention relates to the production of a finely divided matrix material having substantially uniform porosity about the surface thereof and having micropores of controlled size and number density. The microporous matrix material is produced with charged particle tracks resulting from an isotropic source, a portion of which tracks break the surface of the matrix material, followed by etching the latent tracks to produce pores of the desired size.

Porous glass microspheres, for example are used as chromatographic materials. In the past, the production of such microspheres has been based on the principle of phase separation. Upon heat treatment, boron in a silica matrix migrates to the surface of the matrix material and is then dissolved with water or aqueous solutions leaving cavities previously occupied by the boron rich phase. U.S. Pat. Nos. 3,792,987 and 3,843,341 illustrate this process. Another process, illustrated by U.S. Pat. No. 4,169,790, has been based on the treatment of a glass surface with the vapor of a silica dissolving agent. Both of the above-mentioned processes, however, produce materials that are only superfically porous, in that the pores are only formed on the surface of the matrix material.

Fission track etching is a well-known method of nuclear detection in cosmic ray and heavy-ion physics. It has also been applied to the production of filter material, for example, as described in U.S. Pat. No. 3,713,921, in which a plastic film is exposed to a fission plate to produce a known density of collimated fission tracks in the plastic film. The film is then etched to produce microscopic holes of 0.01 to 10 micrometer diameter, the hole size being determined by the etching conditions.

The present invention is related to the process described in U.S. Pat. No. 3,713,921 but differs in that the patent describes a process for producing a porous film wherein the pores are substantially aligned perpendicular to the surface of the film. For the purpose of providing a filter, this arrangement is preferred but for the purpose of providing a finely divided microporous material such as microspheres it is important that the nuclear tracks randomly penetrate the finely divided matrix material such that the resultant pores are interconnected.

In view of the above, it is an object of the present invention to provide a process for the production of a finely divided matrix material having substantially uniform porosity about the surface thereof and the product thereof. It is another object to provide a process and product wherein the finely divided matrix material has porosity of controlled size and nature, as for example channels passing completely through the material. Other objects and features will be in part apparent and in part pointed out hereinafter. The invention accordingly comprises the process and product as hereinafter described, the scope of the invention being indicated by the subjoined claims.

Figure 2:
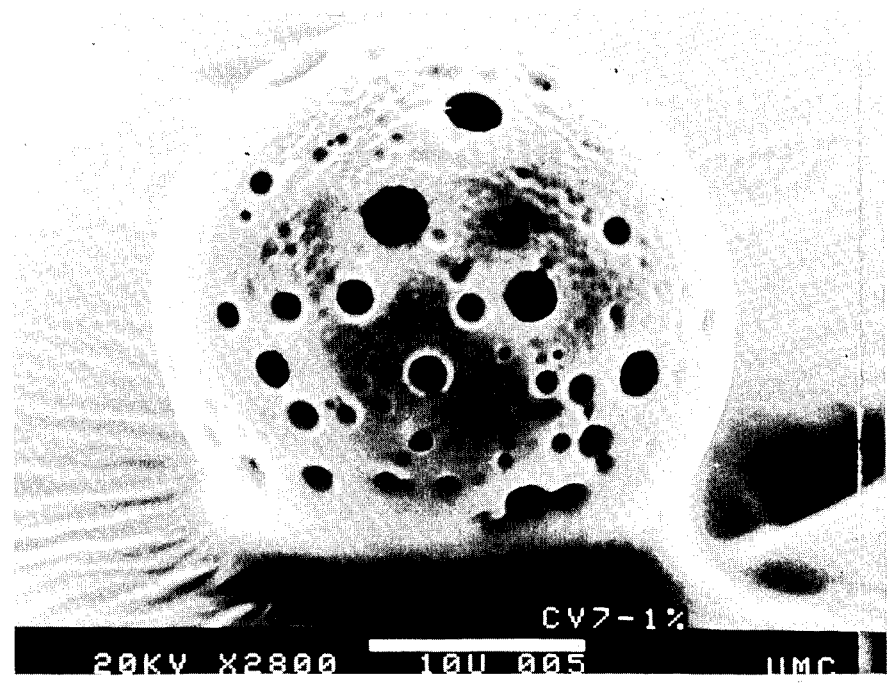
Figure 3:
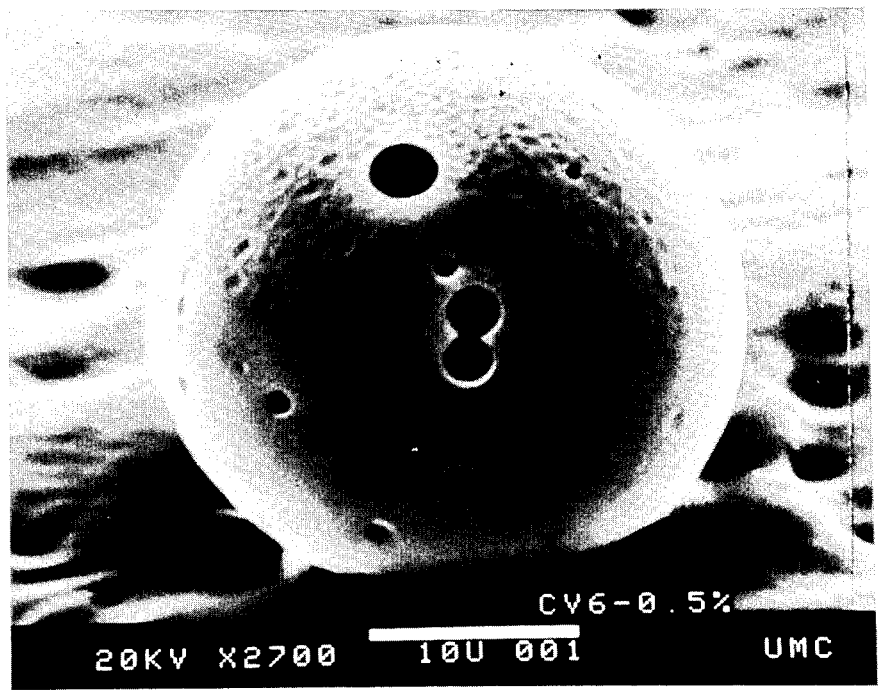

In the drawings, in which several of various possible embodiments of the invention are illustrated showing the effects of variations in irradiation and etching conditions, FIG. 1 is a photomicrograph of sample CV-2 as described in Example 1 below after it was irradiated with thermal neutrons for 150 seconds and etched with 5% hydrofluoric acid for 4 minutes;

FIG. 2 is a photomicrograph of sample CV-7 and is like FIG. 1 except that the microspheres were irradiated for 180 seconds in a different reactor and etched with 1% hydrofuoric acid for 5 minutes; and, FIG. 3 is a photomicrograph of sample CV-6 and is like FIG. 2 except that the microspheres were etched with 0.5% hydrofluoric acid.

In accordance with the present invention, a finely divided matrix material having the property of acquiring a damage track along a path traversed by a charged particle is exposed to charged particles from an isotropic source to produce the desired density of tracks. The isotropic source of charged particles undergoes induced charged particle emission in the presence of neutrons with sufficient energy to induce emission and is incorporated into the matrix material or into a medium into which the matrix material is suspended.

Almost any dielectric solid can be used as a track registration material and can be used as the matrix material in the present invention if the latent tracks are stable such that they do not anneal during normal handling and if a suitable chemical etchant is available. The isotropic source, on the other hand, must be selected such that it emits charged particles capable of leaving a damage track in the matrix material and includes selected nuclides which emit protons, tritons, alphas and fission fragments such as U-235, U-238, Th-232, Li-7, B-10 and the like. In a polymer matrix such as polycarbonates, latent tracks can be formed with protons, tritons or alphas, as well as with fission fragments, whereas when the matrix material is a natural or synthetic glass the charged particle must be a fission fragment.

Neutrons are selected as the irradiation source to trigger the isotropic source because of their high penetrability such that bulk quantities of matrix material can be subjected to very uniform radiation. In addition, they were used because nuclear research reactors are readily available. The required energy which the neutrons must have varies with the selected nuclide. For example, when the nuclide is U-235, Li-7 or B-10, neutrons having an energy less than 0.1 eV can be used but when the nuclide is Th-232, U-238 or the like higher energy neutrons must be used.

In the presence of an irradiation source producing neutrons with appropriate energy, track density is proportional to the concentration of the isotropic source, neutron fluence rate or irradiation time. For example, when the fluence rate is $1 \times 10^{13}$ neutrons per square centimeter per second, comparable track densities are achieved with U-235 in soda-lime based microspheres as described in Example 1 below in 2-5 seconds when the nuclide is present at a level of 500 parts per million (hereinafter referred to as ppm) or in about 9,000 seconds if it is present at a level of 0.1 parts per billion (hereinafter referred to as ppb).

After the finely divided material has been exposed to an isotropic source of charged particles for a time sufficient to produce the desired density of tracks, it is etched with an etchant which preferentially removes the matrix material along the damage tracks thus rendering the matrix material microporous. The etching conditions, including concentration of the etchant, temperature and time, depend upon the etchant and upon the degree it preferentially attacks the damage track. When the desired amount of etching has occurred, the etching process is stopped by neutralizing the etchant or by removing it from the matrix material.

The chosen size of the finely divided matrix material and its particular geometric shape depend upon the particular application to which it is to be put and upon the nature of the porosity desired. The porosity obtained by the present process depends upon the thickness of the finely divided matrix material through which it must penetrate to leave an etchable track. It also depends on the composition of the matrix material since the range of the charged particle is matrix dependent. By way of illustration, the range of the fission fragments from U-235 in silica is about 20 micrometers. When the finely divided matrix material is spherical and has a diameter in the order of twice the range of the fission fragment in the particular matrix, it is possible to produce microporous particles having channels which pass completely through the matrix material after etching. But when the size of the finely divided material is much larger than twice the range of the fission fragment in the particular matrix, then it is only possible to produce surface porosity as it is necessary for the fragment to break the surface of the matrix material or substantially break the surface to be etchable. Applying the above to U-235 at the level that it is naturally present in silica, surface porosity is achieved with particles substantially larger than 40 micrometers, while total porosity is achievable with particles about 40 micrometers and smaller. A suitable etchant for such microspheres is hydrofluoric acid (hereinafter referred to as HF) at a concentration of 0.5 to 5% by volume wherein said microspheres are etched at room temperature for 0.5 to 10 minutes. Comparable polymer microspheres are etched with a caustic like sodium hydroxide at a concentration of 2.5 to 6.5N and at a temperature of 45 to 60 degrees C. for 50 to 180 minutes.

The following examples illustrate the invention.

eters to 40 micrometers were irradiated in two different research reactors and etched for different times.

For the neutron irradiations, 0.5 to 1 gram of material was placed in 2/5 dram poly vials, heat sealed and placed in containers for irradiation. Those samples irradiated at the National Bureau of Standards Research Reactor (hereinafter referred to as NBSR) were exposed to a neutron fluence rate of $1.33 \times 10^{13}$ neutrons per square centimeter per second with a cadmium ratio for gold of 87 for 75, 150 or 300 seconds at 10 megawatts (hereinafterrreferred to as MW) or 12 minutes at 8 MW. Whereas those samples irradiated at the University of Missouri Research Reactor (hereinafter referred to as MURR) were exposed to neutron fluence rate of $5.0 \times 10^{13}$ neutrons per square centimeter per second with a cadmium ratio for gold of 10 for 180 seconds at 10 MW. In both cases, the material was stored for two weeks in order to allow the residual radioactivity to decay before handling.

After the appropriate decay time, the irradiated microspheres were removed from their irradiation container and placed in a $29 \times 10^4$ mm round bottom plastic centrifuge tube. Then 3 milliliters of etchant solution was added and the mixture was agitated for the number of minutes indicated in Table 1 below at 22 degrees C. At the end of the etching process 30 milliliters of distilled water was added to the tube in order to dilute the etchant and to terminate the etching process. Next the tube was centrifuged and the etchant solution extracted and discarded. The microspheres were then rinsed in 30 milliliters of distilled water, agitated, centrifuged and the water discarded. The distilled water rinsing procedure was repeated four times. A final rinsing in ethanol or acetone was made to hasten air drying. The etchant consisted of HF (in a concentration of 0.5%, 1%, 2% or 5%) or a mixture of by volume 1HF:2HCl:3HNO$_3$:6-H$_2$O or 1HF:2HCL:3HNO$_3$:118H$_2$O as indicated in Table 1.

After etching, representative samples from each batch of etched microspheres were placed on scanning electron microscope (SEM) stems and shadowed with gold. The resultant porous microspheres are described in Table 1 and examples are shown in FIGS. 1-3.

TABLE 1

| | Microsphere Irradiation and Track Etching Conditions | | | | |
|---|---|---|---|---|---|
| Sample ID | Reactor Conditions | Etching Conditions | Bead Diameter Range (um) | Pore Diameter Range (um) | Mean Pore Diameter (um) |
| CV-1 | NBSR 300 s | 5% HF/4 m | 23.8–41.1 | 0.71–4.96 | 1.69 |
| CV-2 | NBSR 150 s | 5% HF/4 m | 28.2–32.8 | 1.01–16.45 | 5.28 |
| CV-3-1 | NBSR 75 s | 2% HF/5 m | 30.5–42.6 | 0.79–6.84 | 2.20 |
| CV-3-3 | NBSR 75 s | 1% HF/5 m | 27.5–39.6 | 0.55–2.20 | 1.36 |
| CV-3-4 | NBSR 75 s | 0.5% HF/7.5 m | 27.5–39.6 | 0.72–3.60 | 1.48 |
| CV-4 | NBSR 720 s$^a$ | 5% HF/4 m | 22.5–41.6 | 0.45–19.3 | 2.26 |
| CVM-5-4 | MURR 180 s | 0.5% HF/10 m | 23.8–37.5 | 0.98–3.41 | 1.51 |
| CVM-5-5 | MURR 180 s | 1% HF/0.5 m | 37.5–41.7 | <1.0 | <1.0 |
| CVM-5-7 | MURR 180 s | 1% HF/3 m | 30.8–43.7 | 0.50–9.68 | 1.58 |
| CVM-5-10 | MURR 180 s | 1HF:2HCl:3HNO$_3$:118H$_2$O/7.5 m | 28.4–40.1 | 0.48–3.98 | 1.44 |
| CV-6 | MURR 180 s | 0.5% HF/5 m | 28.1–39.1 | 0.41–5.04 | 1.56 |
| CV-7 | MURR 180 s | 1% HF/5 m | 33.9–43.6 | 1.08–10.8 | 2.75 |
| CV-8 | MURR 180 s | 2% HF/5 m | 28.5–37.5 | 1.12–9.44 | 2.97 |
| CV-9 | MURR 180 s | 5% HF/5 m | 30.8–33.3 | 3.60–9.20 | 7.88 |

EXAMPLE 1

Soda-lime based microspheres consisting of approximately 70% silicon dioxide, 20% sodium oxide and 10% calcium oxide and ranging in diameter from 20 microm- Example 2

The uranium concentration of the microspheres which were irradiated and etched in Example 1 was measured as follows to determine if the uranium distribution in the microspheres was homogeneous or not:

Epoxy resin mounts, measuring 25 mm in diameter, were prepared containing approximately 25 mg of microspheres. The mounts were polished to expose portions of the embedded microspheres and muscovite mica track detectors were then placed over the mounted microspheres. This combination was placed in a polyethylene bag which was hermetically sealed to ensure initimate contact between detector and mount.

Glass standard wafers, NBS SRM 612 and 614, with known uranium concentration of 337.38 ppm and 0.823 ppm U-235 atom percent abundances of 0.2392 and 0.2792, respectively, were also covered with mica detectors and sealed in the same manner as the epoxy mounts. Then both the microspheres mounts and the standard glasses were placed in an irradiation container and irradiated for 300 seconds at a neutron fluence rate of $1.33 \times 10^{13}$ neutrons per square centimeter per second.

Following the irradiation, all residual radioactivity was allowed to decay before the mica detectors were separated. Then the detectors were etched in 48% HF for 45 minutes at 22 degrees C, rinsed in distilled water and air dried. The etched detectors were then mounted on microscope slides for track counting with the aid of an optical transmission light microscope at a magnification of 1200×. The tracks in both detectors, standard glass and microspheres, were counted under the pre-established conditions of either a minimum of at least 1,000 tracks or 50 random fields of view. The random fields of view were of an area of $2.54 \times 10^{-4}$ square centimeters. The track densities found by counting the detectors is reported in Table 2 below.

TABLE 2

Uranium Concentration Determined in the Microspheres

| Sample Code | Irradiation Time (seconds) | Average Track Density (number of tracks per square centimeter) | Uranium Concentration |
|---|---|---|---|
| SB-1 | 300 | $5.507 \times 10^3$ | 161.9 ppb |
| SB-5 | 75 | $1.202 \times 10^3$ | 141.4 ppb |
| SB-7 | 300 | $2.104 \times 10^3$ | 61.9 ppb |
| SRM-612-3 | 75 | $1.005 \times 10^5$ | 35.8 ppm |
| SRM-614-3 | 75 | $2.731 \times 10^3$ | 834.5 ppb |
| SRM-614-1 | 300 | $1.079 \times 10^4$ | 824.1 ppb |
| SRM-612-2[a] | 150 | $2.096 \times 10^5$ | 37.35 ppm |

[a]SRM-612-2, National Dureau of Standards trace element in glass standard reference material, used as standard U-235 isotope abundance of 0.2392, SRM-614 with isotope abundance of 0.2792, and isotope and abundance in microspheres 0.7205.

In view of the above, it will be seen that the several objects of the invention are achieved and other advantageous results obtained. As various changes could be made in the above process and product without departing from the scope of the invention, it is intended that all matter contained in the description shall be interpreted as illustrative and not in a limiting sense.

What is claimed is:

1. A process for the production of microporous finely divided matrix material which comprises:
    (a) incorporating an isotropic source which undergoes charged particle emission in the presence of neutrons into a matrix material or into a medium into which the matrix material is suspended, said matrix material having the property of forming damage tracks along a path traversed by the charged particles emitted by the isotropic source;
    (b) exposing the finely divided matrix material to neutrons having sufficient energy to induce charged particle emission in the isotropic source for a time sufficient to produce the desired density of damage tracks;
    (c) contacting the finely divided matrix material with an etchant which preferentially removes the matrix material along the damage tracks thus rendering the matrix material microporous; and,
    (d) stopping the etchant when the desired amount of etching has been achieved.

2. The process of claim 1 wherein the isotropic source is incorporated into the matrix material.

3. The process of claim 1 wherein the isotropic source is a nuclide selected from the group consisting of U-235, Th-232, Li-7 and B-10.

4. The process of claim 2 wherein the finely divided matrix material has a maximum dimension less than or substantially equal to twice the range of the charged particle in said matrix material whereby the channels produced upon etching pass completely through the matrix material.

5. The process of claim 4 wherein the osotropic source is U-235.

6. The process of claim 5 wherein the finely divided matrix material is a polymer.

7. The process of claim 6 wherein the etchant is sodium hydroxide at a concentration of 2.5 to 6.5N and wherein said microspheres are etched at a temperature of 45 to 60 degrees C. for 50 to 180 minutes.

8. The process of claim 7 wherein the polymer is a polycarbonate.

9. The process of claim 2 wherein the finely divided matrix material has a maximum dimension substantially greater than twice the range of the charged particle in said matrix material whereby upon etching to produce surface porosity.

10. The process of claim 9 wherein the finely divided matrix material is silica glass microspheres having a diameter substantially larger than 40 micrometers and wherein the isotropic source is U-235.

11. The process of claim 10 wherein the etchant is hydrofluoric acid as a concentration of 0.5 to 5% by volume and wherein said microspheres are etched at room temperature for 0.5 to 10 minutes.

12. The process of claim 9 wherein the isotropic source is U-235.

13. The process of claim 12 wherein the finely divided matrix material is a polymer.

14. The process of claim 13 wherein the etchant is sodium hydroxide at a concentration of 2.5 to 6.5N and wherein said microspheres are etched at a temperature of 45 to 60 degrees C. for 50 to 180 minutes.

15. The process of claim 14 wherein the polymer is a polycarbonate.

16. The process of claim 4 wherein the finely divided matrix material is silica glass microspheres having a diameter of 40 micrometers and smaller and wherein the isotropic source is U-235.

17. The process of claim 16 wherein the ecchant is hydrofluoric acid at a concentration of 0.5 to 5% by volume and wherein said microspheres are etched at room temperature for 0.5 to 10 minutes.

18. The product produced by the process of claims 3, 4, 9, 5, 16, 10, 17, 6, 7, 8, 2, 12, 11, 13, 14 or 15.

* * * * *

UNITED STATES PATENT AND TRADEMARK OFFICE
CERTIFICATE OF CORRECTION

PATENT NO. : 4,830,917

DATED : May 16, 1989

INVENTOR(S) : B. Stephen Carpenter et. al

It is certified that error appears in the above-identified patent and that said Letters Patent is hereby corrected as shown below:

Column 6, lines 64 and 65:

Claim 18 should read - - The product produced by the process of claims 1 through 17. - -

Signed and Sealed this

Fourteenth Day of May, 1991

*Attest:*

HARRY F. MANBECK, JR.

*Attesting Officer*  *Commissioner of Patents and Trademarks*